April 19, 1960   C. A. PASSANNANTE   2,933,081
APPARATUS FOR MAKING HEART CONDITION SURVEYS
Filed May 4, 1955   6 Sheets-Sheet 1

INVENTOR
C. A. PASSANNANTE
BY
Angelo M. Pisarra
ATTORNEY

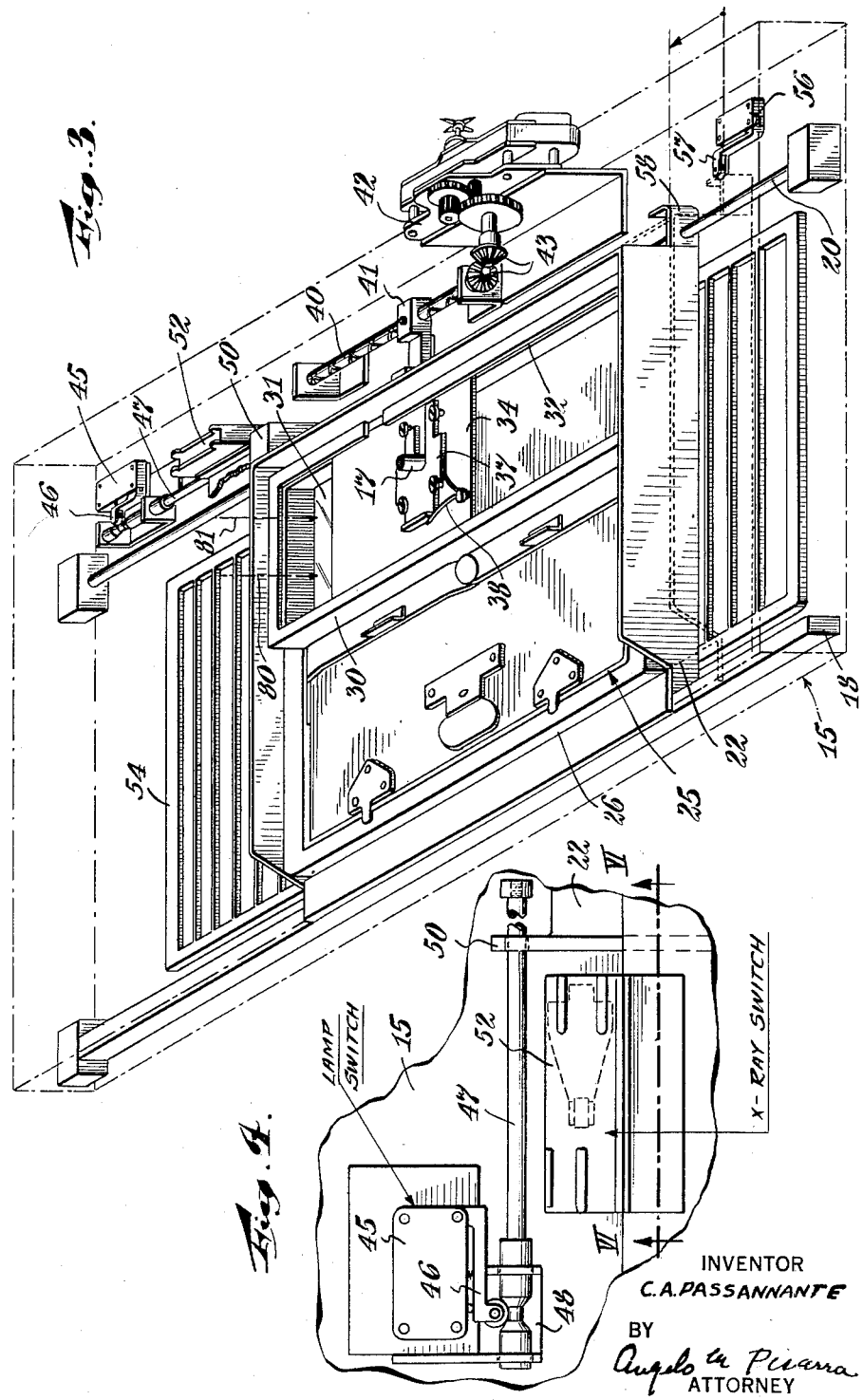

April 19, 1960 C. A. PASSANNANTE 2,933,081
APPARATUS FOR MAKING HEART CONDITION SURVEYS
Filed May 4, 1955 6 Sheets-Sheet 3
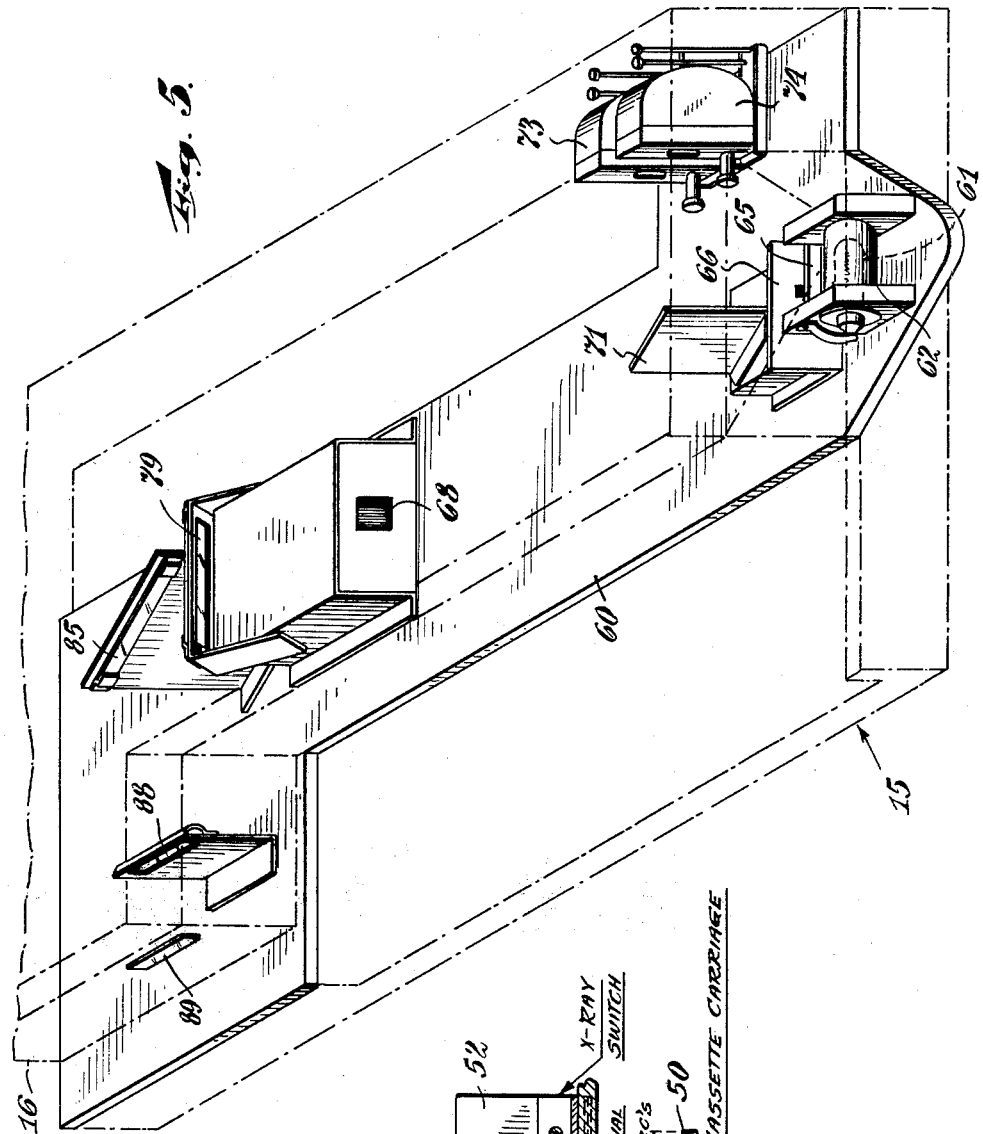
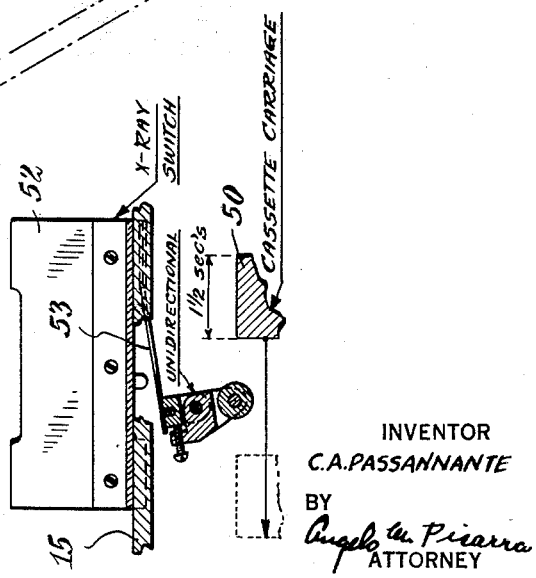
INVENTOR
C.A. PASSANNANTE
BY
ATTORNEY

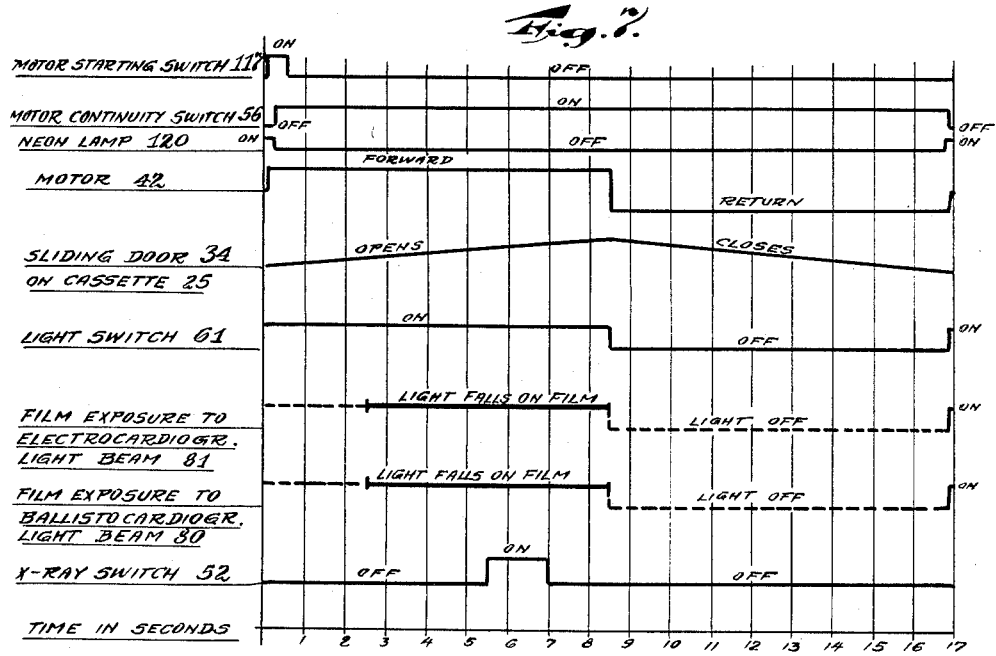
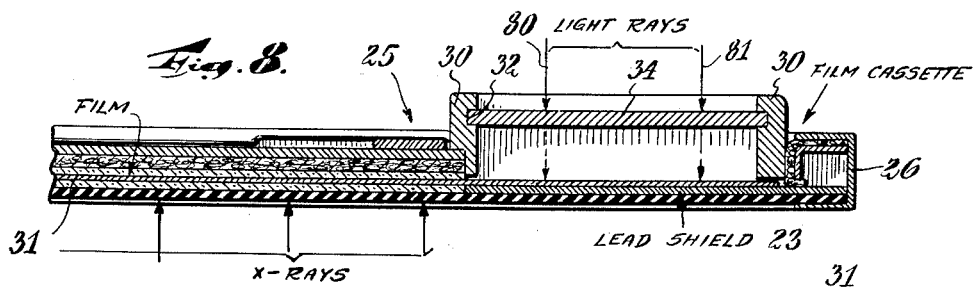
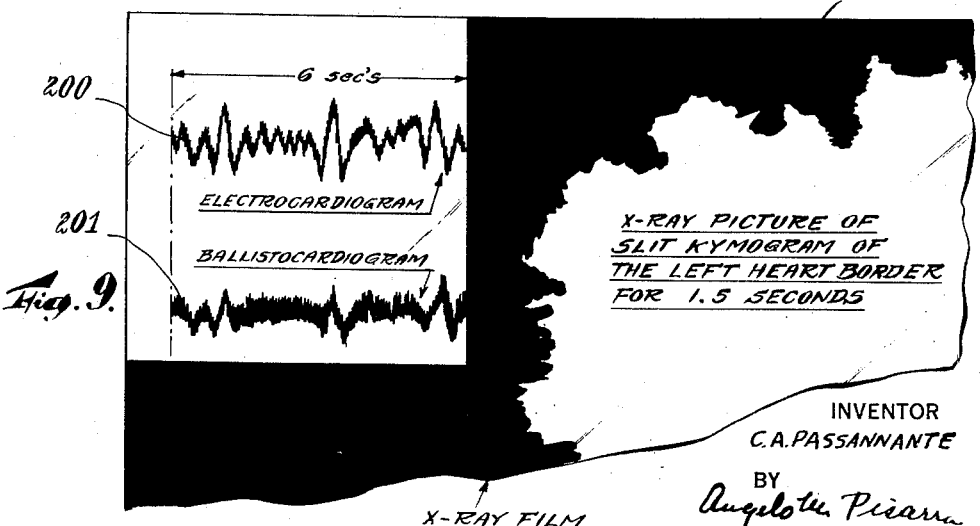

April 19, 1960  C. A. PASSANNANTE  2,933,081
APPARATUS FOR MAKING HEART CONDITION SURVEYS
Filed May 4, 1955  6 Sheets-Sheet 5
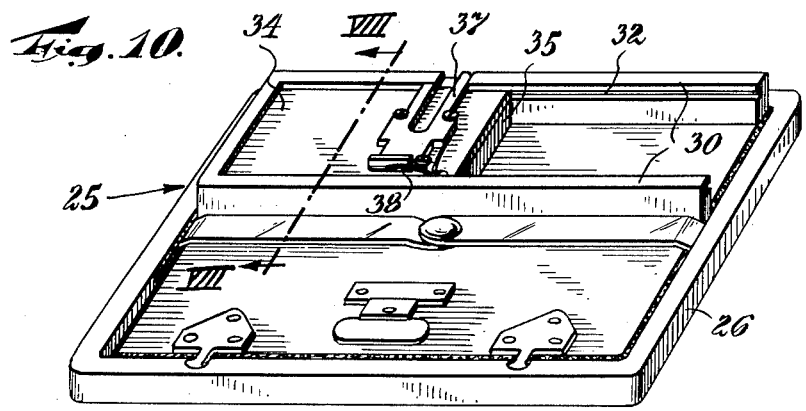
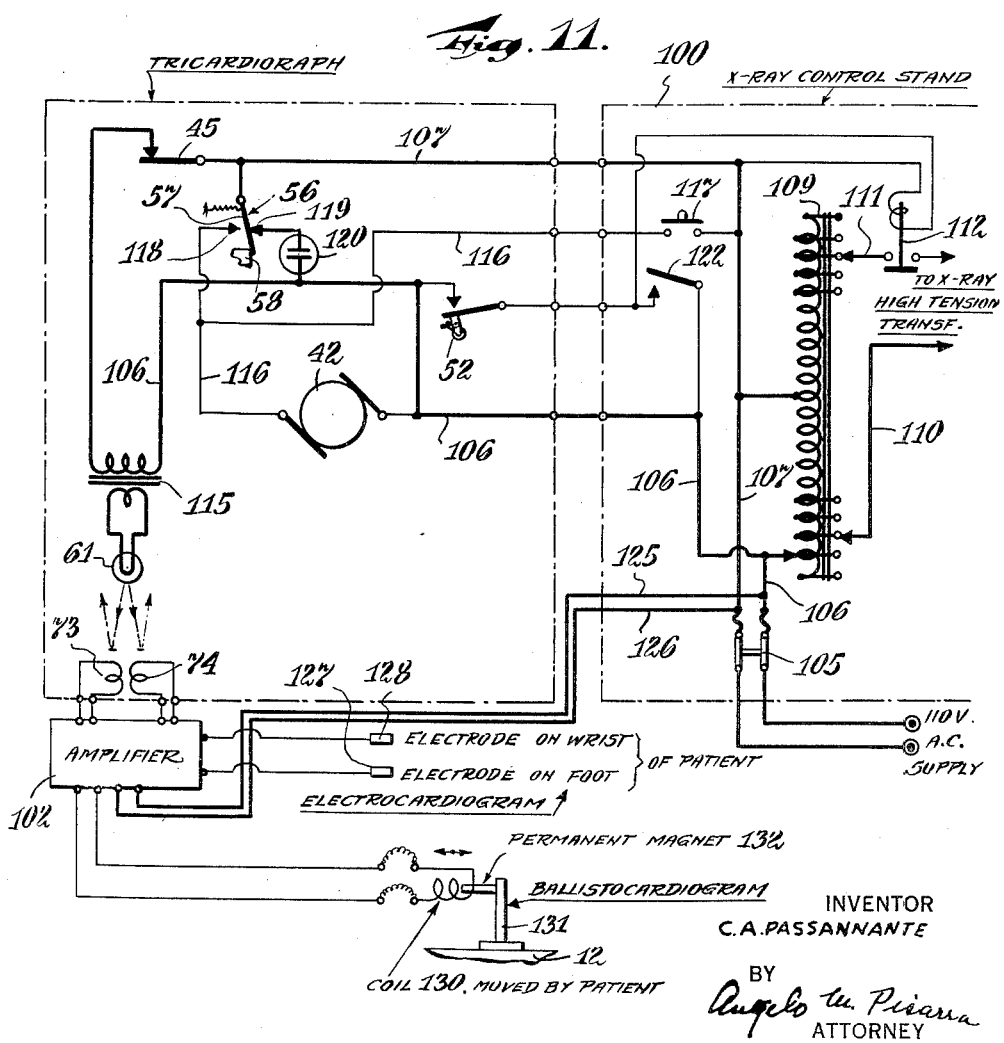
INVENTOR
C.A. PASSANNANTE

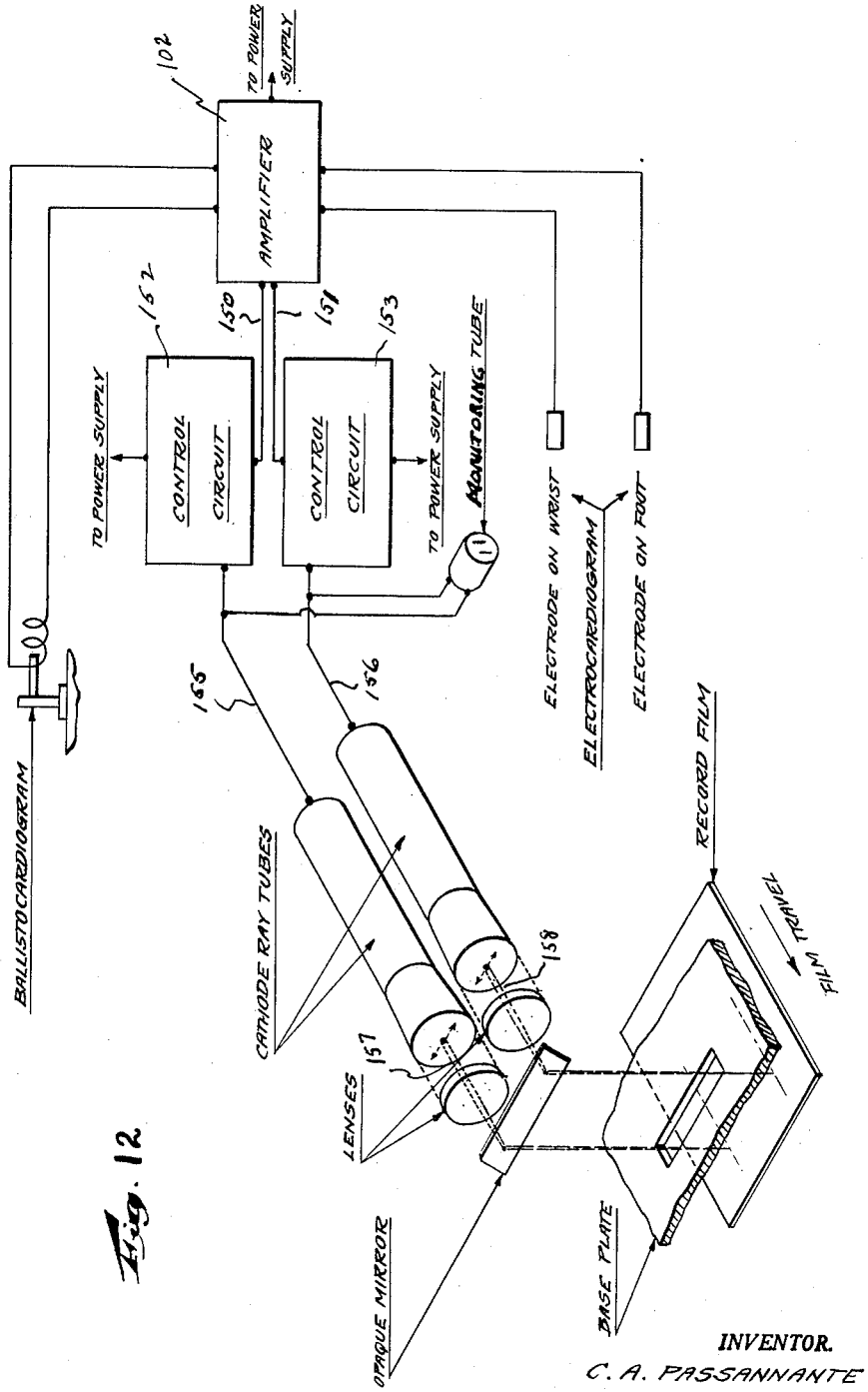

United States Patent Office 2,933,081
Patented Apr. 19, 1960

2,933,081
APPARATUS FOR MAKING HEART CONDITION SURVEYS

Charles A. Passannante, Flushing, N.Y., assignor to F-R Machine Works, Inc., Woodside, N.Y., a corporation of New York Application May 4, 1955, Serial No. 505,859

15 Claims. (Cl. 128—2.06)

This invention relates to novel methods and apparatus for measuring and recording certain characteristics of the human body for determining the condition of the heart.

Heretofore, electrocardiagraph devices have been widely employed for taking the so-called electrocardiagrams which show the intensity and regularity of the pulse. Another device sometimes used is the machine for taking ballistocardiagrams which show the reaction of the body to the action of the heart. Still another device used in this field is an X-ray machine for taking an X-ray picture which shows the relative position of the left heart border in the two extreme positions of its stroke, namely the pumping and suction positions, and known as slit-kymogram.

Prior to this invention, there was no known method or means for providing exact coordination of said recordings which is essential in order that a proper interpretation thereof may be achieved with certainty.

This invention has been made to provide novel methods and apparatus for simultaneously recording on a single film an electrocardiagram, a ballistocardiagram and a slit-kymogram of a particular heart action. By practicing the novel methods and employing the apparatus of this invention, the resultant film contains all of the three records in perfect coordination so that proper interpretation of these three interrelated readings may be made with certainty, and consequently detection of cardiac condition may be ascertained with greater degree of certainty than heretofore. In addition, that information may be ascertained in an easy, rapid, accurate and inexpensive manner. This, as well as other objects and advantages of this invention, will be readily apparent from the following description taken in conjunction with the appended drawings, wherein:

Fig. 3 is a perspective view of a part of the housing and associated parts, being part of the apparatus shown in Fig. 1.

Fig. 4 is a top plan view of a part of the housing shown in Fig. 3.

Fig. 5 is a perspective view of another part of the housing and parts thereof, also being part of the apparatus shown in Fig. 1.

Fig. 6 is a sectional view on line VI—VI of Fig. 4.

Fig. 7 is a timing diagram showing the relationship of operations with respect to time.

Fig. 8 is a sectional view on line VIII—VIII of Fig. 10.

Fig. 9 is a fragmentary view of an example of the developed film produced by employing this invention.

Fig. 10 is a perspective view of a unique and novel cassette holder.

Fig. 11 is a diagrammatic view of the electrical system employed in this invention.

Fig. 12 is a diagrammatic view of a cathode ray tube system which may be used in place of the system shown in Fig. 2.

Figure 1:
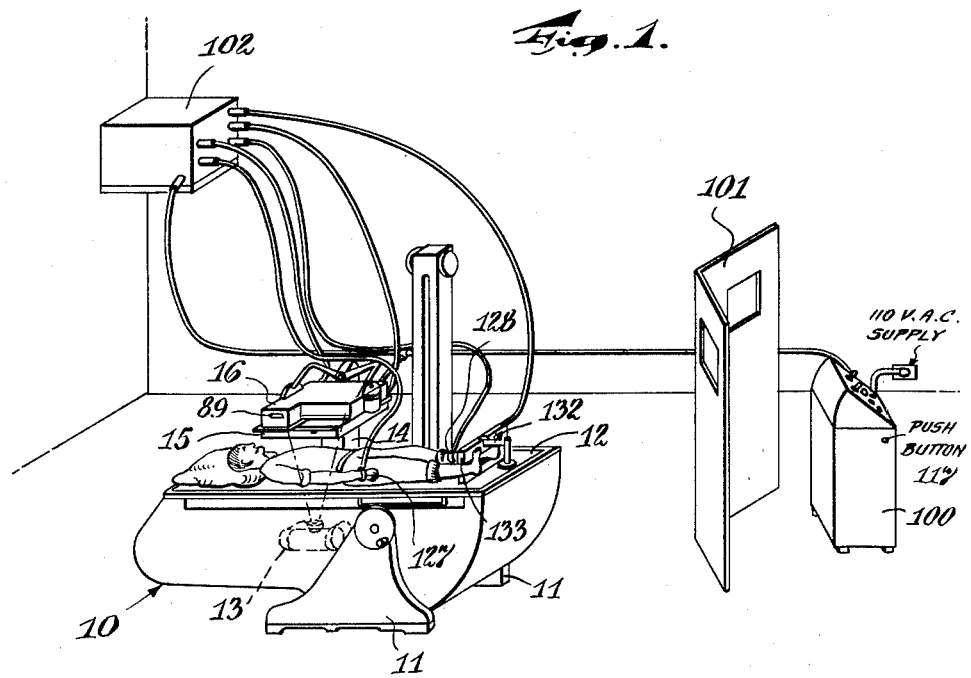
Fig. 1 is a perspective view of the novel apparatus of this invention and shows a patient in position for examination.

Referring to Fig. 1, there is shown a tiltable X-ray table 10 mounted on a pair of uprights or standards 11. The table 10 has a patient supporting top 12. Located within the table 10 and being movable back and forth along the longitudinal axis of said table in the manner well known to the art is an X-ray tube 13. Associated with said X-ray tube 13 and extending upwardly beyond the supporting top 12 is a column 14 carrying a frame 15 at the upper end thereof. The frame 15 together with the X-ray tube 13 and the column 14 are movable in unison back and forth in the same manner as that heretofore employed in the fluoroscopic art. Mounted on the frame 15 is a housing 16 which is coupled therewith. The frame 15, shown in dot-dash line in Figs. 3 and 5, carries a cassette runway guide 18 extending longitudinally thereof. Separated from the guide 18 and being disposed substantially parallel thereto and being carried by the frame 15 is another cassette runway guide 20. A cassette carriage 22 is mounted on said guides 18 and 20 and is movable back and forth thereon.

Demountably mounted and carried by said cassette carriage 22 is a novel cassette 25 shown in Fig. 10. The cassette 25 includes a conventional frame 26. One part of the casette is utilized for taking an X-ray picture and the other part is utilized in obtaining electrocardiagrams and ballistocardiagrams. One part as shown includes a U-shaped frame 30 extending above the frame 26 and being internally grooved at 32 to accommodate a slidable cover 34. A crosspiece 35 is secured to the legs of the element 30 and together with the slidable cover 34 provides a light-proof chamber. The bottom 23 of this light-proof chamber is a lead sheet to protect a recording film 31 from X-rays. The sheet film 31 (Figs. 8 and 9) is located within the cassette and extends across substantially the entire surface thereof within the sides of the frame 26 which is light-proof except for the chamber hereinbefore described. The cover 34 carries a slidable slot-latch 37 automatically actuable by a spring 38 to maintain its locking finger in a slot of the frame 30 before being located in the cassette as shown in Fig. 10. Upon insertion of the cassette 25 in holder 22, a pin 17, attached to a top cover 60, engages latch 37 (Fig. 3) to disengage latch 37 from frame 30.

Carried by the frame 15 is a combination left and right hand thread jackscrew 40 carrying a follower or pawl 41 operably connected to the carriage 22. The jackscrew 40 is driven by a motor drive combination 42 through a pair of bevel gears for driving the jackscrew 40 in one direction and obtaining reciprocating movement of the carriage without the necessity of reversing the direction of rotation of the drive 40.

Mounted on one corner of the frame is a normally closed lamp switch 45 including an actuable control element 46. An actuator rod 47 having enlarged ends is carried by bracket 48 supported by frame 15. Extending from the carriage 22 and slideably mounted on the reduced diameter portion of the rod 47 is an actuator arm 50. The actuator arm 50 is reciprocable in unison with the carriage 22 and in its movement strikes the enlarged portions of the rod 47 to move the arm 46 for opening and closing the switch 45 for making and breaking a lamp switch circuit hereinafter described.

Also carried by the frame 15 is an X-ray switch 52 having an actuable control element 53 which is normally maintained in open position as shown in Fig. 6, and actuable by the arm 50 to make an X-ray circuit hereinafter described, and to maintain said circuit in operation for a predetermined period of time and for breaking said circuit.

Carried by the frame 15 and mounted beneath the cassette carriage 22 is a conventional lead grid 54. At the other end of the frame 15 is a motor continuity switch 56 having a control arm 57 for opening and closing the switch to make or break the motor circuit hereinafter described, said arm 57 being actuable by a trip-arm 58 carried by and reciprocable with carriage 22.

Figure 2:
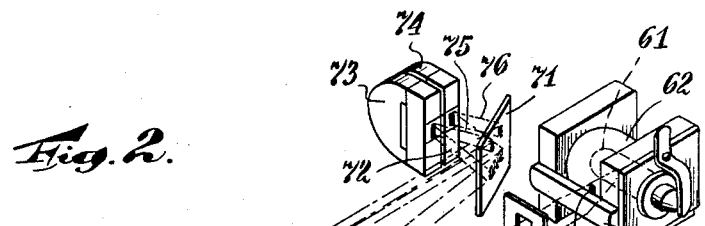
Fig. 2 is a diagrammatic view showing the novel optical system being part of the apparatus shown in Fig. 1.

Mounted on the frame 15 is an intermediate supporting cover 60 carrying the latch opening pin and the optical elements of the invention. At one end of the cover 60 there is located a source of light, an incandescent lamp 61, located in a cylindrical reflector 62 having an oblong aperture 63 in order to obtain a light beam of restricted size and of the desired intensity (Figs. 2 and 5). As a restricted light beam 64 leaves the reflector 62 it is condensed by means of a cylindrical lens 65 located ahead of the opening 63, and the condensed beam 64 passes through a constrictor 66 and subsequently through a light baffle 67 of smaller cross section to eliminate the marginal light rays so that the beam emergent therefrom is of the desired cross section, and the individual rays thereof all being substantially parallel to each other. Then the beam 64 goes through another light baffle 68 and finally to the reflecting surface of an opaque mirror 69. The mirror 69 is fixedly mounted on top 60 at a predetermined angle to the beam 64 incident thereon to reflect beam 64 rearwardly as indicated at 70. Reflected beam 70 passes through the light baffle 68 and is at a small angle to incident beam 64. Light beam 70 strikes an opaque mirror 71 fixedly disposed at 45° thereto. Said reflected beam 70 thus becomes reflected 90° as beam 72 which passes into the oscillograph galvanometers 73 and 74, which are disposed next to each other and are mounted on the top 60. The light rays from the beam 72 impinge upon separate, movable, rectangular mirrors within said galvanometers and are reflected back from the said galvanometers as separate beams 75 and 76 onto reflector 71. These beams 75 and 76 are reflected by reflector 71 as separate beams 77 and 78 which strike a transparent mirror 79 whereupon some of the light rays of these two beams 77 and 78 are reflected downwardly as beams 80 and 81 respectively, which travel downwardly to a condensing lens 82 to provide condensed and constricted beams in the nature of pin points at the film 31 to be affected thereby. The remainder of the light rays of respective beams 77 and 78 pass through the transparent mirror 79 as beams 83 and 84 and impinge upon an opaque reflector 85 and are reflected therefrom as respective beams 86 and 87 which in turn pass through a condensing lens 88 to provide condensed and constricted light beams in the nature of pin points at viewing screen 89 which may be in the form of a ground glass element which is a portion of the cover of the housing 16 which is light-proof. The light images or points on screen 89 serve as a visual means for determining the sweep of the beams which may be controlled by an amplifier.

An X-ray control stand 100 (Fig. 1) which may be remote from the table 10 and separated by a protective screen 101 contains the controlling circuit for the X-ray tube and controls for the electrocardiagrams and ballistocardiagrams through an amplifier 102 to the cassette mechanism, X-ray tube and patient as shown diagrammatically in Fig. 11.

Referring to Figs. 1 and 11, a 110 volt A.C. supply through a line switch 105 through conductors 106 and 107 supplies current to the input of the X-ray auto-transformer 109. The output of the auto-transformer 109 is connected to a conventional X-ray high tension transformer (not shown) through lines 110 and 111, the latter having a normally open relay switch 112 therein. The output side of the high tension X-ray transformer is connected to the X-ray tube 13 in any conventional manner.

Line 106 is also connected to the primary of a small transformer 115 and line 107 is connected to the other side of the transformer 115 through the normally closed lamp switch 45. The other side of the transformer is connected directly to the lamp 61. Line 106 is also connected to one side of the motor of the drive mechanism 42 and the other side of the motor is connected to line 116, through a push button switch 117, to line 107 and also to an open contact 118 of motor continuity switch 56, the other contact 119 of which is connected to line 106 through an indicator neon glow lamp 120. The movable contact 57 of the motor continuity switch 56 is normally in contact with contact 119 because of the position of actuating arm 58 when the cassette is in its inoperative position. This contact 57 which is connected to line 107, is connected to a spring which normally tends to move it from the aforedescribed position to come in contact with contact 118. The X-ray starting switch 52 is connected to the solenoid of switch 112 and its normally open contact is connected to line 106. The other side of the solenoid is connected to line 107. Line 106 is also connected to one side of a normally open X-ray foot switch 122 and its other side is connected to line 106. The foot switch 122 serves merely the purpose of making the device more flexible so that by closing switch 122, only an X-ray picture may be taken and should not be closed when taking the electrocardiagram, ballistocardiagram and kymogram simultaneously. Said other side of the switch 122 is connected to one end of solenoid winding of switch 112 and the other end of the solenoid winding is connected to conductor 107. A pair of conductors 125 and 126 are respectively connected to lines 106 and 107 and supply the power for an amplifier 102. The amplifier 102 serves to amply the changes in current caused by the pulse action of the patient through electrodes 127 and 128 which are normally secured to the patient as shown in Fig. 1 and the resulting amplified current is sent to the galvanometer 74 which in turn controls the operation of the galvanometer.

Mounted on the table top 12 through a support 131 is a permanent magnet 132. Coupled with the patient at his ankles is a crossbar 133 containing coil 130 therein and adjacent one end of the permanent magnet. Upon movement of the body to and fro due to the heart action there is a change of location of the coil 130 with respect to the permanent magnet 132 causing a change of E.M.F. in the lines feeding from coil 130 to amplifier 102 and there amplified is sent to galvanometer 73 to control the operation of that galvanometer to obtain a ballistocardiagram.

The operation of the apparatus is as follows: The patient is placed on table 10 and the leads for electrocardiagraph and ballistocardiagraph are attached to the patient and the apparatus within housing 16 is over the subjects left precordial area. Switch 105 is now closed as the apparatus is now energized in part and the neon lamp is on indicating the apparatus is conditioned for operation. Then the motor starting push button switch 117 is pressed momentarily whereupon line 107 connects to one side of the motor through line 116, the other side of the motor being connected to 106 whereupon the motor rotates and is placed in action. The drive mechanism 42 through the jackscrew 40 operating 41 starts the cassette carriage 22 in one direction of travel whereupon its arm 58 moves away from control 57 allowing the spring to bring control 57 from contact 119 to 118 and thus establishing a continuous current flow through the motor and simultaneously lamp 120 is extinguished, indicating to the operator that the cassette is in travel. Simultaneously with the travel of carriage 22 in that direction, the cover 34 of the cassette 25 is maintained by pin 17 in a stationary position, while the cassette 25 moves forward a short distance over a short period of time, e.g. 2.5 seconds as shown in Fig. 7, the film is now exposed and subjected to the pin points of light from beams 80 and 81 (Fig. 3), and the film for the next six seconds is exposed and subjected to beams 80 and 81 to simultaneously record on film 31, electrocardiagram 200 and ballistocardiagram 201 in perfect time relationship (Fig. 9).

During the initial travel of the cassette 25 and for about 5.5 seconds after its start of travel, the X-ray tube 13 is not energized because switch 52 is still open. However, at the end of that period, which in this example is three seconds after the travelling film has been exposed to beams 80 and 81, the carriage 22 reaches the position where arm 50 actuates control 53 to close X-ray switch 52, and on continued travel maintains switch 52 closed for only 1.5 seconds (Figs. 6 and 7). In this 1.5 second period, there is recorded on the film a slit kymogram of the left heart border in exact time relation with the simultaneously recorded electrocardiagram and ballistocardiagram on said film 31 thus to provide an exactly coordinated triple system for detecting cardiac conditions and for prognosis. After said 1.5 seconds period, the arm 50 travels beyond controller 53 whereupon the switch 52 automatically opens to break the X-ray circuit. The carriage continues for approximately another 1.5 seconds and thus over a period of about six seconds the electrocardiagram and ballistocardiagram are being recorded. Slightly before the end of the six second period, the arm 50 actuates the enlarged end of rod 47 to actuate control 46 to open light switch 45 and break the light circuit whereupon the lamp 61 is deenergized. The carriage continues to move but now travels in the opposite direction to its original position and in the course of this travel the exposed film is made light-tight by cover 34 and the motor drive 42 is cut off by action of arm 58 engaging control 57 of switch 56 when the carriage returns to its original position. This completes the cycle of operation.

During this cycle there may be observed on plate 89 the light beams 86 and 87 is constricted by lens 88 and these light tracings observed are exactly the same as those recorded on film 31. Also during this cycle the X-ray tube 13, the housing 16 and the arm are stationary.

An alternate system which may be employed in place of that shown in Fig. 2 is that shown diagrammatically in Fig. 12.

As therein shown, the leads from the electrodes for obtaining the electrocardiagram and the leads for obtaining the ballistocardiagram are connected to amplifier 102 obtaining power supply from leads 125 and 126 of Fig. 11. The amplified electrical energy from amplifier 102 passes through cables 150 and 151 and is fed into the respective control circuits 152 and 153 whose power is supplied by the secondary of transformer 115 and from amplifier 102 from the respective controls 152 and 153 cables 155 and 156 carry electrical energy to the respective cathode ray tubes which when energized provide light beams 157 and 158 which emanate therefrom and pass through condensing lenses, then to an opaque mirror from which they are reflected downwardly onto the record-receiving film. A monitoring tube is connected across a pair of conductors in cables 155 and 156 to visibly indicate the sweep corresponding to that of the light beams. In the course of operation electrical characteristics of the plates of the cathode ray tubes are modified by the amplified electrical energy from the leads from the elements for taking the electrocardiagram and ballistocardiagram to deflect the beams back and forth in the direction of the arrows. This application is a continuation in part of my copending application Serial No. 263,274 of Dec. 26, 1951, and now abandoned.

I claim:

1. Apparatus of the class described comprising record-receiving means, means for recording an electrocardiagram of an individual on said record-receiving means, means for recording a ballistocardiagram of said individual on said record-receiving means and means for recording an X-ray picture of at least a part of the heart of said individual on said record-receiving means, said last three mentioned means being simultaneously operable for simultaneously recording said electrocardiagram, ballistocardiagram and X-ray picture of said individual on said record-receiving means.

2. Apparatus defined in claim 1, with said fourth means being operable for only a portion of the time period in which said second and third means are operable in a cycle of operation.

3. Apparatus defined in claim 1, said second and third means disposed opposite one face of said first means and said fourth means disposed opposite the other face of said first means.

4. Apparatus of the class described comprising record-receiving means, means operable for recording an electrocardiagram of an individual on said record-receiving means, means operable for recording a ballistocardiagram of said individual on said record-receiving means, means operable for recording an X-ray picture of at least a part of the heart of said individual on said record-receiving means, and means for operating said last three mentioned means to simultaneously record an electrocardiagram, ballistocardiagram and X-ray picture on said record-receiving means.

5. Apparatus described in claim 4, and means for controlling the time of operation of said second, third and fourth means to put said fourth means in operation for a period less than the period of operation of said second and third mentioned means.

6. Apparatus of the class described comprising record-receiver, means for recording an electrocardiagram of an individual, means for recording a ballistocardiagram of said individual and means for recording an X-ray picture of at least a part of the heart of said individual, all of said means being operable simultaneously to record an electrocardiagram, ballistocardiagram and an X-ray picture on said record receiver and means for controlling the time of operation of said last three mentioned to record said X-ray picture over a period less than the period of recording said electrocardiagram and ballistocardiagram.

7. Apparatus of the class described comprising a record-receiver, means for recording an electrocardiagram of an individual on said record-receiver and including a light beam source, means for recording a ballistocardiagram of said individual on said record-receiver and including a light beam source, and means for recording an X-ray picture of at least a part of the heart of said individual on said record-receiver and including a source of X-rays, all of said means being operable simultaneously to record on a record receiver an electrocardiagram, ballistocardiagram and X-ray picture of said individual, by the action of light beams from said light beam sources and the X-ray from said source of X-rays.

8. Apparatus defined in claim 5, and means for controlling the time of operation all of said means to record said X-ray picture over a period less than that for recording said electrocardiagram and ballistocardiagram.

9. Apparatus of the class described comprising record-receiving means, means for recording an X-ray picture of at least a part of the heart of an individual on said record receiving means, means for supporting a patient, means for recording an electrocardiagram of said individual on said record-receiving means and including means for producing a light beam and means for deflecting said light beam, means for recording a ballistocardiagram of said individual on said record-receiving means, and including means for producing a light beam and means for deflecting said light beam, said means for recording said X-ray picture, said means for recording said electrocardiagram and said means for recording said ballistocardiagram being simultaneously operable to record simultaneously on said film an electrocardiagram, a ballistocardiagram and X-ray picture of said individual on said record-receiving means.

10. Apparatus of the class described comprising means for supporting a patient, record-receiving means, support for said record receiving means and being movable with respect to said support, means for recording an electrocardiagram of an individual on said first means, and carried by said support, means for recording a ballistocardiagram of said individual and carried by said support, means for recording an X-ray picture of at least a part of the heart of said individual on said first means, said last three mentioned means being simultaneously operable to record an electrocardiagram, a ballistocardiagram and an X-ray picture of said individual simultaneously on said first means.

11. Apparatus according to claim 10, and means for limiting the period of recording said X-ray picture to a period less than the time period of recording said electrocardiagram and ballistocardiagram.

12. Apparatus of the class described comprising in combination with an X-ray tube and a patient support; of a record-receiving means for providing a pair of light beams, means for deflecting said beams, means adapted to be connected to the human body to be surveyed and to said second means for measuring pulse and body reaction magnitudes, and means for energizing simultaneously said second means and X-ray tube to record simultaneously an electrocardiagram, a ballistocardiagram and X-ray picture on said record receiver.

13. An apparatus of the class described comprising in combination with a patient supporting table and X-ray tube; of a film, a carrier therefor, a light system, a pair of oscillograph galvanometers, the mirrors of said galvanometers being part of said light system, an amplifier, means adapted to be connected to a human body to be surveyed and to said galvanometers through said amplifiers for measuring pulse and body reaction magnitudes, means for moving said film and exposing it to light beams from said light system and simultaneously energizing said X-ray tube to pass X-rays through said body and record on said film.

14. An apparatus of the class described comprising in combination with an X-ray tube and a patient supporting table; of a film, a carrier for said film, means for maintaining said film unexposed, a pair of oscillograph galvanometers, a light system including a source of light, a plurality of reflectors and lenses, each of said galvanometers including a reflector, the reflectors of said galvanometers being part of said light system, an amplifier, means adapted to be connected to the human body and through said amplifier to said galvanometers for measuring pulse-intensity and body-reaction intensity changes, means for moving and simultaneously exposing said film to light beams from said galvanometers to provide light traces on the film on development thereof, and means for exposing said film to X-rays simultaneously with the exposure of said film to said beams.

15. Apparatus of the class described comprising in combination with an X-ray tube and a support for a patient; of a record receiver, a pair of cathode ray tubes for providing individual light beams, means adapted to be connected to the human body to be surveyed and to said tubes for measuring pulse and body reaction magnitudes, and means for simultaneously operating said means and said X-ray tube to simultaneously record an X-ray picture and deflection of said light beams.

References Cited in the file of this patent

UNITED STATES PATENTS

| | | |
|---|---|---|
| 2,294,015 | Salb | Aug. 25, 1942 |
| 2,680,438 | Edwards | June 8, 1954 |

FOREIGN PATENTS

| | | |
|---|---|---|
| 965,738 | France | Feb. 20, 1950 |